Patented Dec. 17, 1935

2,024,398

UNITED STATES PATENT OFFICE 2,024,398

PROCESS FOR PRODUCTION OF LECITHIN FROM VEGETABLE RAW MATERIALS

Samuel O. Sorensen and George F. Beal, Minneapolis, Minn., assignors, by mesne assignments, to American Lecithin Company, a corporation of Ohio No Drawing. Application December 4, 1934, Serial No. 755,880

2 Claims. (Cl. 260—99.20)

In the process for recovering lecithin from vegetable sources such as soybeans or other legumes a method has been employed using alcohol in conjunction with a relatively small proportion of a fat solvent such as benzol. By this method of extraction there is produced a mass comprising some oil and crude phosphatides together with certain additional substances which give the material a very undesirable bitter taste and which render further purification necessary. It has been believed that the presence of alcohol in a major proportion is essential to the production of the lecithin. (See for example U. S. Patents Nos. 1,464,557 and 1,776,720.)

We have discovered that if the vegetable source is extracted with a readily volatile hydrocarbon solvent, such for example as hexane, the phosphatides can be extracted from the vegetable source along with the vegetable oil, and can thereafter readily be separated from the oil, without being contaminated by the bitter impurities. Apparently the impurities are not dissolved by the hydrocarbon solvent. This process not only reduces the cost of production, but gives a superior product, as it has been found exceedingly difficult to eliminate the last traces of the bitter material obtained by the previously operated processes.

In carrying out our invention, the vegetable raw material such as crushed soybeans is extracted with a readily volatile hydrocarbon solvent such as hexane. Other petroleum fractions can be used but the boiling point of the solvent preferably is not over about 90° C. Upon the completion of the extraction the extracted oil and solvent are carried to a still where the solvent is readily removed by distillation. After the solvent has been largely eliminated, the remaining mass is treated with a fairly large volume of water and steam (as by passing water vapor into the oil) and we find that with the percentage of solvent greatly reduced, as a result of the distillation, this water treatment will cause the lecithin to coagulate in substantially pure form. Thereafter the bulk of the oil may be separated from the coagulated lecithin in any desired manner as by passing it through a centrifuge which delivers the oil in relatively pure state and gives a residue of substantially pure lecithin with a small oil admixture.

The product of our process is a brown, semisolid mass with a pleasant odor and taste containing about 60% of lecithin. In view of the fact that the remaining 40% is substantially all edible oil, further refinement is unnecessary for most purposes.

What we claim is:

1. The process of obtaining phosphatides substantially free from bitter taste from vegetable raw materials which comprises the steps of extracting such raw materials with a solvent consisting essentially of hexane, heating the extract to remove solvent, passing water vapor into the residual oil to cause coagulation of the phosphatide and separating the phosphatide from the bulk of the oil.

2. The process of obtaining lecithin in edible form from soybeans which comprises the steps of extracting soybeans with a petroleum hydrocarbon solvent, having a boiling point below about 90° C., heating the extract to remove the solvent, passing water vapor into the residual oil to cause coagulation of the lecithin and separating the lecithin from the bulk of the oil.

SAMUEL O. SORENSEN.
GEORGE F. BEAL.